United States Patent Office 2,784,229
Patented Mar. 5, 1957

2,784,229 p-AMINOBENZYL METHYL ETHER DERIVATIVES

Roy S. Hanslick, Philadelphia, and William F. Bruce, Havertown, Pa., assignors to American Home Products Corporation, New York, N. Y., a corporation of Delaware No Drawing. Application February 24, 1956,
Serial No. 567,448

5 Claims. (Cl. 260—570.6)

This invention relates to new p-aminobenzyl-methyl-ethers and more particularly to α-(chloromethyl)-p-aminobenzyl - methyl - ether and α - (N - methyl - amino-methyl)-p-aminobenzyl-methyl-ether and the non-toxic salts thereof.

These compounds are useful therapeutic agents and more particularly have been found to have potentiating effect for hypnotic agents, as for example, the barbiturates.

Since the bases themselves are oils, it is desirable and particularly for therapeutic purposes, to prepare the mineral and organic acid addition salts of these compounds. We have prepared salts such as the hydrochlorides, d- and d,l-tartrates, the nitrates, phosphates, oxalates, etc.

The compounds in general are prepared by the catalytic reduction of the corresponding p-nitrobenzyl-methyl-ether. The salts may be formed by addition of the corresponding acid, as for example, the hydrochloride by addition of dry HCl, the tartrate by addition of a solution of tartaric acid in ethanol to the reduced product or to the original reaction mixture before reduction, etc. By use of these methods we have formed the hydrochlorides, d- and d,l-tartrates, the nitrates and phosphates of these compounds.

The starting material from which these new compounds are derived is α-chloromethyl-p-nitrobenzyl-methyl-ether, available from Antara Chemicals Division, General Aniline & Film Corporation, 435 Hudson Street, New York, N. Y., and listed in their Organic Chemicals Catalogue.

The following examples are presented in order to more clearly point out suitable methods for preparing the compounds of our invention and are illustrative only and are not intended to limit its scope.

EXAMPLE I

α-Chloromethyl-p-aminobenzyl-methyl-ether hydrochloride

α-Chloromethyl-p-nitrobenzyl-methyl-ether (0.11 M) was dissolved in 100 cc. of ethanol to which was added 0.2 gm. of platinum oxide catalyst. The mixture was shaken in a hydrogen atmosphere at an initial pressure of 50 lbs./sq. in. until the calculated amount of gas was taken up. The catalyst was then removed by filtration, dry hydrogen chloride was added and then ether to form crystals. The crystals were filtered and dried. M. P. 123–124° C.

Calculated for Cl: 31.98%. Found: 31.3%.

EXAMPLE II

α-Chloromethyl-p-aminobenzyl-methyl-ether hydrochloride

The same method as Example I was used except that the HCl was added to the original reaction mixture before reduction. M. P. 122–123° C.

Calculated for N: 6.3%. Found: 6.0%.

EXAMPLE III

α-(N-methyl-amino-methyl)-p-aminobenzyl-methyl-ether dihydrochloride

α - Chloromethyl - p - nitrobenzyl-methyl-ether (0.1 M) was dissolved in 100 cc. of ethanol containing 0.32 M of methylamine. The mixture was allowed to stand at 0.5° C. and the temperature allowed to rise over 48 hours. The flaky solid was filtered off, washed with aqueous caustic solution and dried. The precipitate is α-(N-methyl - amino - methyl)-p-nitro-benzyl-methyl-ether, is brick red in color and has a M. P. of 79° C. This material was reduced as in Example I to form the desired product. M. P. 260–261° C.

Calculated for N: 10.98%. Found: 10.93%.

EXAMPLE IV

α-Chloromethyl-p-aminobenzyl-methyl-ether-d-tartrate

The same method as Example I was used substituting a solution of 0.1 M of d-tartaric acid in a minimum amount of ethanol for the dry HCl. The solid was crystallized from isopropanol. M. P. 82–84° C.

EXAMPLE V

α-Chloromethyl-p-aminobenzyl-methyl-ether-oxalate

The method used was the same as Example IV using oxalic acid. M. P. 91° C.

Calculated for chlorine, 12.9%; nitrogen 5.1%. Found: chlorine, 12.4%; nitrogen, 5.9%.

EXAMPLE VI

α-Chloromethyl-p-aminobenzyl-methyl-ether-d-tartrate

The method herein was the same as Example IV except that the d-tartaric acid was added to the original reaction mixture before reduction. M. P. 82–83° C.

Calculated for chlorine: 10.58%. Found: 10.25%.

EXAMPLE VII

α-Chloromethyl-p-aminobenzyl-methyl-ether-d-tartrate 20 gm. of α-chloromethyl-p-nitrobenzyl-methyl-ether was dissolved in 220 ml. of ethanol. 5 gm. of moist activated Raney nickel was added and suspended by vigorous stirring. The reaction vessel, surrounded by cool water bath, was flushed with nitrogen, and 10 ml. of hydrazine hydrate in 25 ml. of ethanol was added dropwise over a two-hour period. The reaction temperature was held between 35–40° C. The mixture was stirred for 1½ hours after addition was complete. The mixture was filtered under nitrogen and the filtrate concentrated under vacuum without heat, yielding 16 gm. of syrup. This was poured slowly into a warm solution of d-tartaric acid (15 gm.) in 100 ml. methanol. The crystalline product was filtered, washed, dried and re-crystallized from isopropanol. M. P. 86–87° C.

We claim:

1. A member selected from the group consisting of α - (chloromethyl) - p - aminobenzyl-methyl-ether, α-(N-methyl - amino-methyl)-p-aminobenzyl-methyl-ether and the nontoxic acid addition salts thereof.

2. α-(Chloromethyl)-p-aminobenzyl-methyl-ether.

3. α - (Chloromethyl)-p-aminobenzyl-methyl-ether hydrochloride.

4. α-(N-methyl-amino-methyl)-p-aminobenzyl-methyl-ether.

5. α-(N-methyl-amino-methyl)-p-aminobenzyl-methyl-ether dihydrochloride.

No references cited.